United States Patent
Nagashima et al.

[11] Patent Number: 6,043,973
[45] Date of Patent: Mar. 28, 2000

[54] CERAMIC CAPACITOR

[75] Inventors: Mitsuru Nagashima; Kazuhiro Yoshida, both of Shimane-ken; Masanobu Kishi; Makoto Murata, both of Izumo, all of Japan

[73] Assignee: Murata Manufacturing Co., Ltd., Japan

[21] Appl. No.: 08/974,289

[22] Filed: Nov. 19, 1997

[30] Foreign Application Priority Data

Nov. 20, 1996 [JP] Japan ................................. 8-309811

[51] Int. Cl.⁷ ...................................................... H01G 4/12
[52] U.S. Cl. ...................... 361/305; 361/306.1; 361/311; 361/320
[58] Field of Search ................................. 361/305, 301.1, 361/302, 303, 306.1, 307, 308.1, 309, 310, 321.1, 321.4, 321.5

[56] References Cited

U.S. PATENT DOCUMENTS

| | | | |
|---|---|---|---|
| 3,638,085 | 1/1972 | Tierman | 29/25.42 |
| 4,038,587 | 7/1977 | Kaliebe | 361/321 |
| 4,130,854 | 12/1978 | Hertz | 361/304 |
| 4,536,259 | 8/1985 | Oda et al. | 204/35.1 |
| 4,604,676 | 9/1985 | Senda et al. | 361/309 |
| 4,720,766 | 1/1988 | Honda | 361/275 |
| 4,740,863 | 4/1988 | Langlois | 29/25.42 |
| 4,908,685 | 3/1990 | Shibasaki et al. | 357/27 |
| 5,426,560 | 6/1995 | Amaya et al. | 361/309 |
| 5,534,843 | 7/1996 | Tsunoda et al. | 338/22 |
| 5,612,560 | 3/1997 | Chivukual et al. | 257/309 |
| 5,793,057 | 8/1998 | Summerfelt | 257/55 |
| 5,889,647 | 3/1999 | Hansen et al. | 361/311 |

FOREIGN PATENT DOCUMENTS

| | | | |
|---|---|---|---|
| 40721533 | 8/1995 | Japan | H01C 7/10 |

*Primary Examiner*—Kristine Kincaid
*Assistant Examiner*—Eric W. Thomas
*Attorney, Agent, or Firm*—Ostrolenk, Faber, Gerb & Soffen, LLP

[57] ABSTRACT

A ceramic capacitor having an improved electrode soldering performance, little or no diffusion of solder even in the case of being used under a high temperature environment and a reduced characteristic deterioration is provided. The dry plating electrodes have a three-layer structure. First layers of the electrodes are respectively provided on both surfaces of a ceramic element assembly and made of any one or more of Cu, Ni—Cu alloy and Zn. Second layers of the electrodes are respectively provided on the surfaces of the first layers and made of a material different from the material of the first layers and any one or more of Cr, Ni—Cr alloy, Fe—Cr alloy, Co—Cr alloy, Ti, Zn, Al, W, V and Mo. Third layers of the electrodes are respectively provided on the surfaces of the second layers and made of any one or more of Cu, Ni—Cu alloy, Ag and Au.

8 Claims, 1 Drawing Sheet

CERAMIC CAPACITOR

BACKGROUND OF THE INVENTION

The present invention relates to a ceramic capacitor and particularly relates to a plate like ceramic capacitor which is used in a high temperature environment.

Generally, the ceramic capacitor of this type is structured such that electrodes are provided on both surfaces of the plate like ceramic element assembly, and further, a lead terminal is soldered to each of the electrodes. Then, as a conventional electrode, a baked coated electrode or a wet plated electrode made of Ag, Cu or the like, which is a metal easily soldered, is applied or it has been considered to form a baked coated electrode or a wet plated electrode made of Ni, Zn or the like, which is a metal in which the Sn contained in the solder is hardly diffused, is applied.

When the ceramic capacitor having the baked coated electrode or the wet plated electrode made of Ag, Cu or the like is used in a high temperature environment (for example, about 150° C.), the Sn contained in the solder used for bonding the lead terminal diffuses into the electrode so that the bonding strength between the electrode and the ceramic deteriorates. Accordingly, there is a risk of problems such as the dielectric loss of the ceramic capacitor being increased, and corona discharge produced in the gap between the electrode and the ceramic will break the ceramic capacitor.

In the case of the ceramic capacitor having the coated baked electrode or the wet plated electrode made of Ni, Zn and the like, since Sn contained in the solder is hardly discharged, the above troubles do not occur.

However, there occurs another problem such that the soldering operation of the electrode is deteriorated. Accordingly, it becomes necessary to use a chlorine flux which has a problem in reliably bonding the lead terminal and to provide another electrode for mounting the lead terminal on the electrode made of Ni, Zn or the like.

SUMMARY OF THE INVENTION

An object of the present invention is to provide a ceramic capacitor having an improved performance when soldering an electrode, and no diffusion of solder even in the case of being used in a high temperature environment and reduced characteristic deterioration.

In order to achieve the above object, in accordance with the present invention, there is provided a ceramic capacitor comprising:

(a) a ceramic element assembly and a dry plated electrode provided on a surface of the ceramic element assembly; and (b) the dry plated electrode having a first layer made of any one or more of Cu, Ni—Cu alloy and Zn, a second layer provided on a surface of the first layer and of a material different from the material of the first layer and is any one or more of Cr, Ni—Cr alloy, Fe—Cr alloy, Co—Cr alloy, Ti, Zn, Al, W, V and Mo, and a third layer provided on a surface of the second layer and made of any one or more of Cu, Ni—Cu alloy, Ag and Au. Further, it is preferable that the thickness of the first layer is about 500 angstroms or more, the thickness of the second layer is about 100 angstroms or more and the thickness of the third layer is about 500 angstroms or more.

Due to the above structure, the first layer secures a suitable strong bonding between the ceramic element assembly and the electrode. The second layer prevents diffusion of the solder (particularly, of Sn contained in the solder) from developing at the interface between the ceramic element assembly and the electrode. Further, the third layer improves the operability of the soldering.

Other features and advantages of the present invention will become apparent from the following description of the invention which refers to the accompanying drawings.

DETAILED DESCRIPTION OF THE INVENTION

Figure 1:
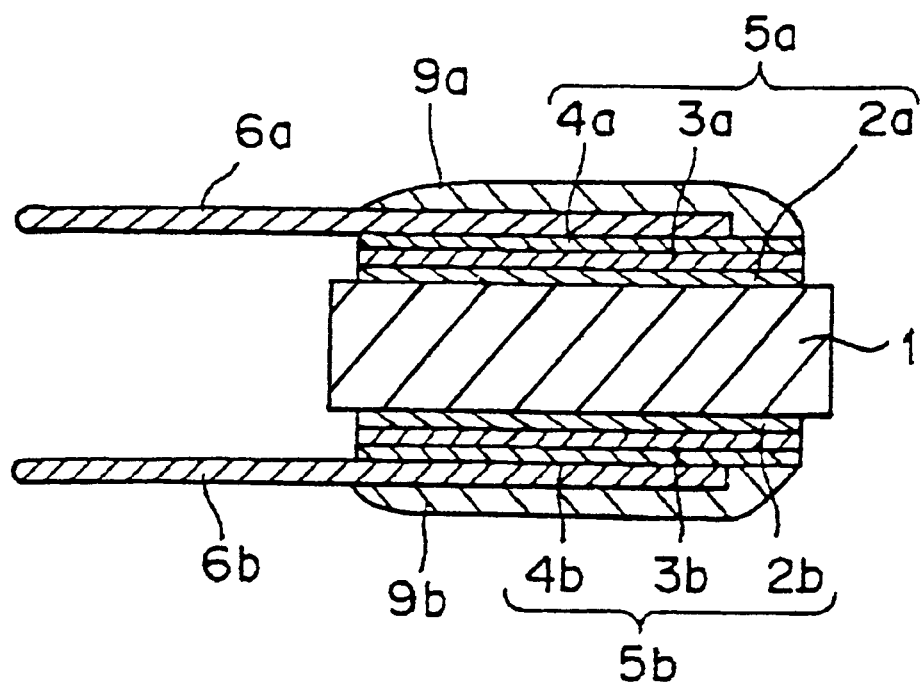
FIG. 1 is a cross sectional view which shows an embodiment of a ceramic capacitor in accordance with the present invention.

An embodiment of a ceramic capacitor in accordance with the present invention will be explained below with reference to the accompanying drawing.

As shown in FIG. 1, a ceramic capacitor is provided with a ceramic element assembly 1, electrodes 5a and 5b respectively formed on both surfaces of the ceramic element assembly, and lead terminals 6a and 6b respectively bonded to the electrodes 5a and 5b by solders 9a and 9b. The ceramic element assembly 1 is made of, for example, a ceramic dielectric of the $BaTiO_3$ system, $SrTiO_3$ system and $TiO_2$ system and the like.

The electrodes 5a and 5b are formed on both surfaces of the ceramic element assembly by a dry plating method after the ceramic element assembly 1 is heated to a predetermined temperature. The heating temperature of the ceramic element assembly 1 is not critical but it is preferable to set the temperature to about 150° C. or less so as to decrease the residual stress within the ceramic element assembly 1. The dry plating method includes, for example, the sputtering method, depositing method, thermal spraying method, ion plating method and the like. The dry plated electrodes 5a and 5b have a three-layer construction.

First layers 2a and 2b of the electrodes 5a and 5b are respectively provided on both surfaces of the ceramic element assembly 1 and are made of any one or more of Cu, Ni—Cu alloy and Zn. These metals or alloys are materials capable of obtaining a suitable bonding power with respect to the ceramic and the bonding power is considered to be obtained by a suitable bonding with oxygen within the ceramic. Accordingly, a suitable bonding strength can be secured between the ceramic element assembly 1 and the electrodes 5a and 5b. On the contrary, if the bonding between the metal (or the alloy) and the oxygen within the ceramic is too weak, the bonding strength between the ceramic element assembly and the electrodes is insufficient, and inversely if the bonding is too strong, the characteristic is deteriorated due to reduction of the ceramic element assembly.

Second layers 3a and 3b of the electrodes 5a and 5b are respectively provided on the surfaces of the first layers 2a and 2b, and are made of a material which is different from the material used for the first layer 2a and 2b and comprises any one or more of Cr, Ni—Cr alloy, Fe—Cr alloy, Co—Cr alloy, Ti, Zn, Al, W, V and Mo.

These metals or alloys materials into which Sn and Pb hardly diffuse so that the diffusion of the solders 9a and 9b (particularly, of Sn contained in the solders 9a and 9b) does not extend to the interface between the ceramic element assembly 1 and the electrode 5a and the interface between the ceramic element assembly 1 and the electrode 5b. Accordingly, the bonding strength between the electrodes 5a and 5b and the ceramic element assembly 1 is not deteriorated so that there does not occur the problems such that the dielectric loss of the ceramic capacitor is increased, or that the ceramic capacitor is broken due to corona discharge in the gap produced between the electrodes and the ceramic element assembly.

Third layers 4a and 4b of the electrodes 5a and 5b are respectively provided on the surfaces of the second layers 3a and 3b, and are made of any one or more of Cu, Ni—Cu alloy, Ag and Au. These metals or alloys are materials having an improved wetting property vis-a-vis the solder so that the lead terminals 6a and 6b can be bonded to the electrodes 5a and 5b with high reliability.

Further, the thickness of the first layers 2a and 2b is set to about 500 angstroms or more, the thickness of the second layers 3a and 3b is set to about 100 angstroms or more and the thickness of the third layers 4a and 4b is set to about 500 angstroms or more. This is because if the thickness is less than the above value, there is a risk that the above operation and effect of the respective layers 2a to 4b will be insufficiently obtained. The ceramic capacitor obtained by the above manner has an improved electrode 5a and 5b soldering performance, a reduced diffusion developing characteristic of the solder even if the ceramic capacitor is used under a high temperature environment, and a reduced performance deterioration.

Further, the ceramic capacitor in accordance with the present invention is not limited to the above embodiment and can be variously modified within the scope of the invention. Particularly, the shape of the ceramic element assembly, the shape of the electrodes and the like are optional so that various kinds of shapes such as a circular shape, an oval shape, a rectangular shape and the like can be selected in correspondence to the specification.

Next, experimental results performed by the inventors of the present invention will be described below with reference to FIG. 1. A ceramic capacitor sample for the experimentation is manufactured in the following manner. After heating a disc like ceramic element assembly 1 of $BaTiO_3$ system ceramic having a diameter of 13 mm and a thickness of 0.5 mm to a temperature of 150° C. or less under a vacuum of $10^{-4}$ Torr, a metal or alloy selected among Cu, Ni—Cu alloy and Zn is sputtered to the upper and lower surfaces of the ceramic element assembly 1, thereby respectively forming the first layers 2a and 2b having a thickness of at least 500 angstroms.

Next, a metal or alloy selected among Cr, Ni—Cr alloy, Fe—Cr alloy, Co—Cr alloy, Ti, Zn, Al, W, V and Mo is sputtered, thereby respectively forming the second layers 3a and 3b having a thickness of at least 100 angstroms on the surfaces of the first layers 2a and 2b. Further, a metal or alloy selected among Cu, Ni—Cu alloy, Ag and Au is sputtered, thereby forming the third layers 4a and 4b having a thickness of at least 500 angstroms on the surfaces of the second layers 3a and 3b.

As mentioned above, after the electrodes 5a and 5b are respectively formed on both surfaces of the ceramic element assembly 1, the lead terminals 6a and 6b made of a soldered annealed copper wire and having a diameter of 0.6 mm are respectively bonded to the electrodes 5a and 5b by solders 9a and 9b, and the wetting property of the solder thereof has been observed. Further, after keeping the ceramic capacitor sample at a temperature of 125° C. for 1000 hours, electric characteristics such as dielectric constant $\epsilon$, dielectric loss and insulation resistance have been measured. The measured results shown in tables 1—1 to 1-11 have been obtained. The wetting property of the solder in the tables is determined such as to be good if the contact angle between the electrodes 5a and 5b and the solders 9a and 9b is less than 90 degrees, and to be bad if the contact angle is equal to or more than 90 degrees.

TABLE 1-1

| Electrode | | | Wetting | | Insulation |
|---|---|---|---|---|---|
| First Layer | Second Layer | Third Layer | Property of Solder | $\epsilon$ | Dielectric Loss (%) | Resistance (MΩ) |
| Cu | Cr | Cu | Good | 8200 | 0.51 | 80000 |
| Cu | Cr | Ni—Cu (70:30) | Good | 8200 | 0.51 | 80000 |
| Cu | Cr | Ni—Cu (10:90) | Good | 8200 | 0.51 | 80000 |
| Cu | Cr | Ag | Good | 8200 | 0.51 | 80000 |
| Cu | Cr | Au | Good | 8200 | 0.51 | 80000 |
| Cu | Ni—Cr (90:10) | Cu | Good | 8200 | 0.51 | 80000 |
| Cu | Ni—Cr (90:10) | Ni—Cu (70:30) | Good | 8200 | 0.51 | 80000 |
| Cu | Ni—Cr (90:10) | Ni—Cu (10:90) | Good | 8200 | 0.51 | 80000 |
| Cu | Ni—Cr (90:10) | Ag | Good | 8200 | 0.51 | 80000 |
| Cu | Ni—Cr (90:10) | Au | Good | 8200 | 0.51 | 80000 |
| Cu | Ni—Cr (20:80) | Cu | Good | 8200 | 0.51 | 80000 |
| Cu | Ni—Cr (20:80) | Ni—Cu (70:30) | Good | 8200 | 0.51 | 80000 |
| Cu | Ni—Cr (20:80) | Ni—Cu (10:90) | Good | 8200 | 0.51 | 80000 |
| Cu | Ni—Cr (20:80) | Ag | Good | 8200 | 0.51 | 80000 |
| Cu | Ni—Cr (20:80) | Au | Good | 8200 | 0.51 | 80000 |
| Cu | Ni—Cr (83:17) | Cu | Good | 8200 | 0.51 | 80000 |
| Cu | Ni—Cr (83:17) | Ni—Cu (70:30) | Good | 8200 | 0.51 | 80000 |
| Cu | Fe—Cr (83:17) | Ni—Cu (10:90) | Good | 8200 | 0.51 | 80000 |
| Cu | Fe—Cr (83:17) | Ag | Good | 8200 | 0.51 | 80000 |
| Cu | Fe—Cr (83:17) | Au | Good | 8200 | 0.51 | 80000 |

TABLE 1-2

| Electrode | | | Wetting | | Insulation |
|---|---|---|---|---|---|
| First Layer | Second Layer | Third Layer | Property of Solder | $\epsilon$ | Dielectric Loss (%) | Resistance (MΩ) |
| Cu | Co—Cr (50:50) | Cu | Good | 8200 | 0.51 | 80000 |
| Cu | Co—Cr (50:50) | Ni—Cu (70:30) | Good | 8200 | 0.51 | 80000 |
| Cu | Co—Cr (50:50) | Ni—Cu (10:90) | Good | 8200 | 0.51 | 80000 |
| Cu | Co—Cr (50:50) | Ag | Good | 8200 | 0.51 | 80000 |
| Cu | Co—Cr (50:50) | Au | Good | 8200 | 0.51 | 80000 |
| Cu | Ti | Cu | Good | 8200 | 0.56 | 80000 |
| Cu | Ti | Ni—Cu (70:30) | Good | 8200 | 0.56 | 80000 |
| Cu | Ti | Ni—Cu (10:90) | Good | 8200 | 0.56 | 80000 |
| Cu | Ti | Ag | Good | 8200 | 0.56 | 80000 |
| Cu | Ti | Au | Good | 8200 | 0.56 | 80000 |

TABLE 1-2-continued

| Electrode | | | Wetting | Electrical Characteristic | | Insulation |
|---|---|---|---|---|---|---|
| First Layer | Second Layer | Third Layer | Property of Solder | $\epsilon$ | Dielectric Loss (%) | Resistance (MΩ) |
| Cu | Zn | Cu | Good | 8200 | 0.62 | 80000 |
| Cu | Zn | Ni—Cu (70:30) | Good | 8200 | 0.62 | 80000 |
| Cu | Zn | Ni—Cu (10:90) | Good | 8200 | 0.62 | 80000 |
| Cu | Zn | Ag | Good | 8200 | 0.62 | 80000 |
| Cu | Zn | Au | Good | 8200 | 0.62 | 80000 |
| Cu | Al | Cu | Good | 8200 | 0.60 | 80000 |
| Cu | Al | Ni—Cu (70:30) | Good | 8200 | 0.60 | 80000 |
| Cu | Al | Ni—Cu (10:90) | Good | 8200 | 0.60 | 80000 |
| Cu | Al | Ag | Good | 8200 | 0.60 | 80000 |
| Cu | Al | Au | Good | 8200 | 0.60 | 80000 |
| Cu | W | Cu | Good | 8200 | 0.58 | 80000 |
| Cu | W | Ni—Cu (70:30) | Good | 8200 | 0.58 | 80000 |
| Cu | W | Ni—Cu (10:90) | Good | 8200 | 0.58 | 80000 |
| Cu | W | Ag | Good | 8200 | 0.58 | 80000 |
| Cu | W | Au | Good | 8200 | 0.58 | 80000 |

TABLE 1-3

| Electrode | | | Wetting | Electrical Characteristic | | Insulation |
|---|---|---|---|---|---|---|
| First Layer | Second Layer | Third Layer | Property of Solder | $\epsilon$ | Dielectric Loss (%) | Resistance (MΩ) |
| Cu | V | Cu | Good | 8200 | 0.58 | 80000 |
| Cu | V | Ni—Cu (70:30) | Good | 8200 | 0.58 | 80000 |
| Cu | V | Ni-Cu (10:90) | Good | 8200 | 0.58 | 80000 |
| Cu | V | Ag | Good | 8200 | 0.58 | 80000 |
| Cu | V | Au | Good | 8200 | 0.58 | 80000 |
| Cu | Mo | Cu | Good | 8200 | 0.58 | 80000 |
| Cu | Mo | Ni—Cu (70:30) | Good | 8200 | 0.58 | 80000 |
| Cu | Mo | Ni—Cu (10:90) | Good | 8200 | 0.58 | 80000 |
| Cu | Mo | Ag | Good | 8200 | 0.58 | 80000 |
| Cu | Mo | Au | Good | 8200 | 0.58 | 80000 |
| Ni—Cu (70:30) | Cr | Cu | Good | 8300 | 0.48 | 60000 |
| Ni—Cu (70:30) | Cr | Ni—Cu (70:30) | Good | 8300 | 0.48 | 60000 |
| Ni—Cu (70:30) | Cr | Ni—Cu (10:90) | Good | 8300 | 0.48 | 60000 |
| Ni—Cu (70:30) | Cr | Ag | Good | 8300 | 0.48 | 60000 |
| Ni—Cu (70:30) | Cr | Au | Good | 8300 | 0.48 | 60000 |
| Ni—Cu (70:30) | Ni—Cr (90:10) | Cu | Good | 8300 | 0.48 | 60000 |
| Ni—Cu (70:30) | Ni—Cr (90:10) | Ni—Cu (70:30) | Good | 8300 | 0.48 | 60000 |
| Ni—Cu (70:30) | Ni—Cr (90:10) | Ni—Cu (10:90) | Good | 8300 | 0.48 | 60000 |
| Ni—Cu (70:30) | Ni—Cr (90:10) | Ag | Good | 8300 | 0.48 | 60000 |
| Ni—Cu (70:30) | Ni—Cr (90:10) | Au | Good | 8300 | 0.48 | 60000 |
| Ni—Cu (70:30) | Ni—Cr (20:80) | Cu | Good | 8300 | 0.48 | 60000 |

TABLE 1-4

| Electrode | | | Wetting | Electrical Characteristic | | Insulation |
|---|---|---|---|---|---|---|
| First Layer | Second Layer | Third Layer | Property of Solder | $\epsilon$ | Dielectric Loss (%) | Resistance (MΩ) |
| Ni—Cu (70:30) | Ni—Cr (20:80) | Ni—Cu (10:80) | Good | 8200 | 0.48 | 60000 |
| Ni—Cu (70:30) | Ni—Cr (20:80) | Ag | Good | 8200 | 0.48 | 60000 |
| Ni—Cu (70:30) | Ni—Cr (20:80) | Au | Good | 8200 | 0.48 | 60000 |
| Ni—Cu (70:30) | Fe—Cr (83:17) | Cu | Good | 8200 | 0.48 | 60000 |
| Ni—Cu (70:30) | Fe—Cr (83:17) | Ni—Cu (70:30) | Good | 8200 | 0.48 | 60000 |
| Ni—Cu (70:30) | Fe—Cr (83:17) | Ni—Cu (10:90) | Good | 8200 | 0.48 | 60000 |
| Ni—Cu (70:30) | Fe—Cr (83:17) | Ag | Good | 8200 | 0.48 | 60000 |
| Ni—Cu (70:30) | Fe—Cr (83:17) | Au | Good | 8200 | 0.48 | 60000 |
| Ni—Cu (70:30) | Co—Cr (50:50) | Cu | Good | 8200 | 0.48 | 60000 |
| Ni—Cu (70:30) | Co—Cr (50:50) | Ni—Cu (70:30) | Good | 8200 | 0.48 | 60000 |
| Ni—Cu (70:30) | Co—Cr (50:50) | Ni—Cu (10:90) | Good | 8300 | 0.48 | 60000 |
| Ni—Cu (70:30) | Co—Cr (50:50) | Ag | Good | 8300 | 0.48 | 60000 |
| Ni—Cu (70:30) | Co—Cr (50:50) | Au | Good | 8300 | 0.48 | 60000 |
| Ni—Cu (70:30) | Ti | Cu | Good | 8300 | 0.53 | 60000 |
| Ni—Cu (70:30) | Ti | Ni—Cu (70:30) | Good | 8300 | 0.53 | 60000 |
| Ni—Cu (70:30) | Ti | Ni—Cu (10:90) | Good | 8300 | 0.53 | 60000 |
| Ni—Cu (70:30) | Ti | Ag | Good | 8300 | 0.53 | 60000 |
| Ni—Cu (70:30) | Ti | Au | Good | 8300 | 0.53 | 60000 |
| Ni—Cu (70:30) | Zn | Cu | Good | 8300 | 0.55 | 60000 |

TABLE 1-5

| Electrode | | | Wetting | Electrical Characteristic | | Insulation |
|---|---|---|---|---|---|---|
| First Layer | Second Layer | Third Layer | Property of Solder | $\epsilon$ | Dielectric Loss (%) | Resistance (MΩ) |
| Ni—Cu (70:30) | Zn | Ni—Cu (70:30) | Good | 8300 | 0.55 | 60000 |
| Ni—Cu (70:30) | Zn | Ni—Cu (10:90) | Good | 8300 | 0.55 | 60000 |
| Ni—Cu (70:30) | Zn | Ag | Good | 8300 | 0.55 | 60000 |
| Ni—Cu (70:30) | Zn | Au | Good | 8300 | 0.55 | 60000 |
| Ni—Cu (70:30) | Al | Cu | Good | 8300 | 0.53 | 60000 |
| Ni—Cu (70:30) | Al | Ni—Cu (70:30) | Good | 8300 | 0.53 | 60000 |
| Ni—Cu (70:30) | Al | Ni—Cu (10:90) | Good | 8300 | 0.53 | 60000 |
| Ni—Cu (70:30) | Al | Ag | Good | 8300 | 0.53 | 60000 |
| Ni—Cu (70:30) | Al | Au | Good | 8300 | 0.53 | 60000 |
| Ni—Cu (70:30) | W | Cu | Good | 8300 | 0.51 | 60000 |
| Ni—Cu (70:30) | W | Ni—Cu | Good | 8300 | 0.51 | 60000 |

TABLE 1-5-continued

| Electrode | | | Wetting | Electrical Characteristic | | Insulation |
|---|---|---|---|---|---|---|
| First Layer | Second Layer | Third Layer | Property of Solder | $\epsilon$ | Dielectric Loss (%) | Resistance (MΩ) |
| (70:30) | | (70:30) | | | | |
| Ni—Cu (70:30) | W | Ni—Cu (10:90) | Good | 8300 | 0.51 | 60000 |
| Ni—Cu (70:30) | W | Ag | Good | 8300 | 0.51 | 60000 |
| Ni—Cu (70:30) | W | Au | Good | 8300 | 0.51 | 60000 |
| Ni—Cu (70:30) | V | Cu | Good | 8300 | 0.51 | 60000 |
| Ni—Cu (70:30) | V | Ni—Cu (70:30) | Good | 8300 | 0.51 | 60000 |
| Ni—Cu (70:30) | V | Ni—Cu (10:90) | Good | 8300 | 0.51 | 60000 |
| Ni—Cu (70:30) | V | Ag | Good | 8300 | 0.51 | 60000 |
| Ni—Cu (70:30) | V | Au | Good | 8300 | 0.51 | 60000 |

TABLE 1-6

| Electrode | | | Wetting | Electrical Characteristic | | Insulation |
|---|---|---|---|---|---|---|
| First Layer | Second Layer | Third Layer | Property of Solder | $\epsilon$ | Dielectric Loss (%) | Resistance (MΩ) |
| Ni—Cu (70:30) | Mo | Cu | Good | 8300 | 0.51 | 60000 |
| Ni—Cu (70:30) | Mo | Ni—Cu (70:30) | Good | 8300 | 0.51 | 60000 |
| Ni—Cu (70:30) | Mo | Ni—Cu (10:90) | Good | 8300 | 0.51 | 60000 |
| Ni—Cu (70:30) | Mo | Ag | Good | 8300 | 0.51 | 60000 |
| Ni—Cu (70:30) | Mo | Au | Good | 8300 | 0.51 | 60000 |
| Ni—Cu (10:90) | Cr | Cu | Good | 8250 | 0.45 | 70000 |
| Ni—Cu (10:90) | Cr | Ni—Cu (70:30) | Good | 8250 | 0.45 | 70000 |
| Ni—Cu (10:90) | Cr | Ni—Cu (10:90) | Good | 8250 | 0.45 | 70000 |
| Ni—Cu (10:90) | Cr | Ag | Good | 8250 | 0.45 | 70000 |
| Ni—Cu (10:90) | Cr | Au | Good | 8250 | 0.45 | 70000 |
| Ni—Cu (10:90) | Ni—Cr (90:10) | Cu | Good | 8250 | 0.45 | 70000 |
| Ni—Cu (10:90) | Ni—Cr (90:10) | Ni—Cu (70:30) | Good | 8250 | 0.45 | 70000 |
| Ni—Cu (10:90) | Ni—Cr (90:10) | Ni—Cu (10:90) | Good | 8250 | 0.45 | 70000 |
| Ni—Cu (10:90) | Ni—Cr (90:10) | Ag | Good | 8250 | 0.45 | 70000 |
| Ni—Cu (10:90) | Ni—Cr (90:10) | Au | Good | 8250 | 0.45 | 70000 |
| Ni—Cu (10:90) | Ni—Cr (20:80) | Cu | Good | 8250 | 0.45 | 70000 |
| Ni—Cu (10:90) | Ni—Cr (20:80) | Ni—Cu (70:30) | Good | 8250 | 0.45 | 70000 |
| Ni—Cu (10:90) | Ni—Cr (20:80) | Ni—Cu (10:90) | Good | 8250 | 0.45 | 70000 |
| Ni—Cu (10:90) | Ni—Cr (20:80) | Ag | Good | 8250 | 0.45 | 70000 |

TABLE 1-7

| Electrode | | | Wetting | Electrical Characteristic | | Insulation |
|---|---|---|---|---|---|---|
| First Layer | Second Layer | Third Layer | Property of Solder | $\epsilon$ | Dielectric Loss (%) | Resistance (MΩ) |
| Ni—Cu (10:90) | Ni—Cr (20:80) | Au | Good | 8250 | 0.45 | 70000 |
| Ni—Cu (10:90) | Fe—Cr (83:17) | Cu | Good | 8250 | 0.45 | 70000 |
| Ni—Cu (10:90) | Fe—Cr (83:17) | Ni—Cu (70:30) | Good | 8250 | 0.45 | 70000 |
| Ni—Cu (10:90) | Fe—Cr (83:17) | Ni—Cu (10:90) | Good | 8250 | 0.45 | 70000 |
| Ni—Cu (10:90) | Fe—Cr (83:17) | Ag | Good | 8250 | 0.45 | 70000 |
| Ni—Cu (10:90) | Fe—Cr (83:17) | Au | Good | 8250 | 0.45 | 70000 |
| Ni—Cu (10:90) | Co—Cr (50:50) | Cu | Good | 8250 | 0.45 | 70000 |
| Ni—Cu (10:90) | Co—Cr (50:50) | Ni—Cu (70:30) | Good | 8250 | 0.45 | 70000 |
| Ni—Cu (10:90) | Co—Cr (50:50) | Ni—Cu (10:90) | Good | 8250 | 0.45 | 70000 |
| Ni—Cu (10:90) | Co—Cr (50:50) | Ag | Good | 8250 | 0.45 | 70000 |
| Ni—Cu (10:90) | Co—Cr (50:50) | Au | Good | 8250 | 0.45 | 70000 |
| Ni—Cu (10:90) | Ti | Cu | Good | 8250 | 0.50 | 70000 |
| Ni—Cu (10:90) | Ti | Ni—Cu (70:30) | Good | 8250 | 0.50 | 70000 |
| Ni—Cu (10:90) | Ti | Ni—Cu (10:90) | Good | 8250 | 0.50 | 70000 |
| Ni—Cu (10:90) | Ti | Ag | Good | 8250 | 0.50 | 70000 |
| Ni—Cu (10:90) | Ti | Au | Good | 8250 | 0.50 | 70000 |
| Ni—Cu (10:90) | Zn | Cu | Good | 8250 | 0.53 | 70000 |
| Ni—Cu (10:90) | Zn | Ni—Cu (70:30) | Good | 8250 | 0.53 | 70000 |
| Ni—Cu (10:90) | Zn | Ni—Cu (10:90) | Good | 8250 | 0.53 | 70000 |

TABLE 1-8

| Electrode | | | Wetting | Electrical Characteristic | | Insulation |
|---|---|---|---|---|---|---|
| First Layer | Second Layer | Third Layer | Property of Solder | $\epsilon$ | Dielectric Loss (%) | Resistance (MΩ) |
| Ni—Cu (10:90) | Zn | Ag | Good | 8250 | 0.53 | 70000 |
| Ni—Cu (10:90) | Zn | Au | Good | 8250 | 0.53 | 70000 |
| Ni—Cu (10:90) | Al | Cu | Good | 8250 | 0.51 | 70000 |
| Ni—Cu (10:90) | Al | Ni—Cu (70:30) | Good | 8250 | 0.51 | 70000 |
| Ni—Cu (10:90) | Al | Ni—Cu (10:90) | Good | 8250 | 0.51 | 70000 |
| Ni—Cu (10:90) | Al | Ag | Good | 8250 | 0.51 | 70000 |
| Ni—Cu (10:90) | Al | Au | Good | 8250 | 0.51 | 70000 |
| Ni—Cu (10:90) | W | Cu | Good | 8250 | 0.49 | 70000 |
| Ni—Cu (10:90) | W | Ni—Cu (70:30) | Good | 8250 | 0.49 | 70000 |
| Ni—Cu (10:90) | W | Ni—Cu (10:90) | Good | 8250 | 0.49 | 70000 |
| Ni—Cu (10:90) | W | Ag | Good | 8250 | 0.49 | 70000 |

TABLE 1-8-continued

| Electrode | | | Wetting | Electrical Characteristic | | |
|---|---|---|---|---|---|---|
| First Layer | Second Layer | Third Layer | Property of Solder | ε | Dielectric Loss (%) | Insulation Resistance (MΩ) |
| (10:90) | | | | | | |
| Ni—Cu (10:90) | W | Au | Good | 8250 | 0.49 | 70000 |
| Ni—Cu (10:90) | V | Cu | Good | 8250 | 0.49 | 70000 |
| Ni—Cu (10:90) | V | Ni—Cu (70:30) | Good | 8250 | 0.49 | 70000 |
| Ni—Cu (10:90) | V | Ni—Cu (10:90) | Good | 8250 | 0.49 | 70000 |
| Ni—Cu (10:90) | V | Ag | Good | 8250 | 0.49 | 70000 |
| Ni—Cu (10:90) | V | Au | Good | 8250 | 0.49 | 70000 |
| Ni—Cu (10:90) | Mo | Cu | Good | 8250 | 0.49 | 70000 |
| Ni—Cu (10:90) | Mo | Ni—Cu (70:30) | Good | 8250 | 0.49 | 70000 |

TABLE 1-9

| Electrode | | | Wetting | Electrical Characteristic | | |
|---|---|---|---|---|---|---|
| First Layer | Second Layer | Third Layer | Property of Solder | ε | Dielectric Loss (%) | Insulation Resistance (MΩ) |
| Ni—Cu (10:90) | Mo | Ni—Cu (10:90) | Good | 8250 | 0.49 | 70000 |
| Ni—Cu (10:90) | Mo | Ag | Good | 8250 | 0.49 | 70000 |
| Ni—Cu (10:90) | Mo | Au | Good | 8250 | 0.49 | 70000 |
| Zn | Cr | Cu | Good | 8350 | 0.59 | 70000 |
| Zn | Cr | Ni—Cu (70:30) | Good | 8350 | 0.59 | 70000 |
| Zn | Cr | Ni—Cu (10:90) | Good | 8350 | 0.59 | 70000 |
| Zn | Cr | Ag | Good | 8350 | 0.59 | 70000 |
| Zn | Cr | Au | Good | 8350 | 0.59 | 70000 |
| Zn | Ni—Cu (10:90) | Cu | Good | 8350 | 0.59 | 70000 |
| Zn | Ni—Cu (10:90) | Ni—Cu (70:30) | Good | 8350 | 0.59 | 70000 |
| Zn | Ni—Cu (10:90) | Ni—Cu (10:90) | Good | 8350 | 0.59 | 70000 |
| Zn | Ni—Cu (10:90) | Ag | Good | 8350 | 0.59 | 70000 |
| Zn | Ni—Cu (90:10) | Au | Good | 8350 | 0.59 | 70000 |
| Zn | Ni—Cr (20:80) | Cu | Good | 8350 | 0.59 | 70000 |
| Zn | Ni—Cr (20:80) | Ni—Cu (70:30) | Good | 8350 | 0.59 | 70000 |
| Zn | Ni—Cr (20:80) | Ni—Cu (10:90) | Good | 8350 | 0.59 | 70000 |
| Zn | Ni—Cr (20:80) | Ag | Good | 8350 | 0.59 | 70000 |
| Zn | Ni—Cr (20:80) | Au | Good | 8350 | 0.59 | 70000 |
| Zn | Fe—Cr (83:17) | Cu | Good | 8350 | 0.59 | 70000 |
| Zn | Fe—Cr (83:17) | Ni—Cu (70:30) | Good | 8350 | 0.59 | 70000 |

TABLE 1-10

| Electrode | | | Wetting | Electrical Characteristic | | |
|---|---|---|---|---|---|---|
| First Layer | Second Layer | Third Layer | Property of Solder | ε | Dielectric Loss (%) | Insulation Resistance (MΩ) |
| Zn | Fe—Cr (83:17) | Ni—Cu (10:90) | Good | 8350 | 0.59 | 40000 |
| Zn | Fe—Cr (83:17) | Ag | Good | 8350 | 0.59 | 40000 |
| Zn | Fe—Cr (83:17) | Au | Good | 8350 | 0.59 | 40000 |
| Zn | Co—Cr (50:50) | Cu | Good | 8350 | 0.59 | 40000 |
| Zn | Co—Cr (50:50) | Ni—Cu (70:30) | Good | 8350 | 0.59 | 40000 |
| Zn | Co—Cr (50:50) | Ni—Cu (10:90) | Good | 8350 | 0.59 | 40000 |
| Zn | Co—Cr (50:50) | Ag | Good | 8350 | 0.59 | 40000 |
| Zn | Co—Cr (50:50) | Au | Good | 8350 | 0.59 | 40000 |
| Zn | Ti | Cu | Good | 8350 | 0.65 | 40000 |
| Zn | Ti | Ni—Cu (70:30) | Good | 8350 | 0.65 | 40000 |
| Zn | Ti | Ni—Cu (10:90) | Good | 8350 | 0.65 | 40000 |
| Zn | Ti | Ag | Good | 8350 | 0.65 | 40000 |
| Zn | Ti | Au | Good | 8350 | 0.65 | 40000 |
| Zn | Zn | Cu | Good | 8350 | 0.63 | 40000 |
| Zn | Zn | Ni—Cu (70:30) | Good | 8350 | 0.63 | 40000 |
| Zn | Zn | Ni—Cu (10:90) | Good | 8350 | 0.63 | 40000 |
| Zn | Zn | Ag | Good | 8350 | 0.63 | 40000 |
| Zn | Zn | Au | Good | 8350 | 0.63 | 40000 |
| Zn | Al | Cu | Good | 8350 | 0.63 | 40000 |
| Zn | Al | Ni—Cu (70:30) | Good | 8350 | 0.63 | 40000 |
| Zn | Al | Ni—Cu (10:90) | Good | 8350 | 0.63 | 40000 |
| Zn | Al | Ag | Good | 8350 | 0.63 | 40000 |
| Zn | Al | Au | Good | 8350 | 0.63 | 40000 |
| Zn | W | Cu | Good | 8350 | 0.63 | 40000 |

TABLE 1-11

| Electrode | | | Wetting | Electrical Characteristic | | |
|---|---|---|---|---|---|---|
| First Layer | Second Layer | Third Layer | Property of Solder | ε | Dielectric Loss (%) | Insulation Resistance (MΩ) |
| Zn | W | Ni—Cu (70:30) | Good | 8350 | 0.63 | 40000 |
| Zn | W | Ni—Cu (10:90) | Good | 8350 | 0.63 | 40000 |
| Zn | W | Ag | Good | 8350 | 0.63 | 40000 |
| Zn | W | Au | Good | 8350 | 0.63 | 40000 |
| Zn | V | Cu | Good | 8350 | 0.63 | 40000 |
| Zn | V | Ni—Cu (70:30) | Good | 8350 | 0.63 | 40000 |
| Zn | V | Ni—Cu (10:90) | Good | 8350 | 0.63 | 40000 |
| Zn | V | Ag | Good | 8350 | 0.63 | 40000 |
| Zn | V | Au | Good | 8350 | 0.63 | 40000 |
| Zn | Mo | Cu | Good | 8350 | 0.63 | 40000 |
| Zn | Mo | Ni—Cu (70:30) | Good | 8350 | 0.63 | 40000 |
| Zn | Mo | Ni—Cu (10:90) | Good | 8350 | 0.63 | 40000 |
| Zn | Mo | Ag | Good | 8350 | 0.63 | 40000 |
| Zn | Mo | Au | Good | 8350 | 0.63 | 40000 |

As is understood from the tables, the electrodes 5a and 5b have a good soldering performance, and have excellent values of the dielectric constant $\epsilon$, dielectric loss and insulation resistance so that the effect of the present invention is significant.

As is clear by the above description and in accordance with the present invention, since the dry plated electrode on the surface of the ceramic element assembly is structured by a first layer made of any one or more of Cu, Ni—Cu alloy and Zn, a second layer provided on a surface of the first layer and made of a material different from the material of the first layer and further any one or more of Cr, Ni—Cr alloy, Fe—Cr alloy, Co—Cr alloy, Ti, Zn, Al, W, V and Mo, and a third layer provided on a surface of the second layer and made of any one or more of Cu, Ni—Cu alloy, Ag and Au, a ceramic capacitor having improved electrode soldering performance, little or no diffusion of solder even under a high temperature environment and a reduced characteristic deterioration can be obtained.

Although the present invention has been described in relation to particular embodiments thereof, many other variations and modifications and other uses will become apparent to those skilled in the art.

What is claimed is:

1. A ceramic capacitor comprising:

a ceramic element assembly and a capacitance obtaining dry plated electrode on a surface of the ceramic element assembly;

wherein said dry plated electrode has a first layer of at least one member selected from the group consisting of Cu, Ni—Cu alloy and Zn, a second layer on a surface of the first layer and of a material different from the material of said first layer and being at least one material selected from the group consisting of Cr, Ni—Cr alloy, Fe—Cr alloy, Co—Cr alloy, Ti, Zn, Al, W, V and Mo, and a third layer on a surface of the second layer and being at least one material selected from the group consisting of Cu, Ni—Cu alloy, Ag and Au.

2. A ceramic capacitor as recited in claim 1, wherein said first layer has a thickness of at least about 500 angstroms or more, said second layer has a thickness of at least about 100 angstroms or more and said third layer has a thickness of at least about 500 angstroms or more.

3. A ceramic capacitor as recited in claim 2, wherein said first layer is Cu.

4. A ceramic capacitor as recited in claim 2, wherein said first layer is Ni—Cu alloy.

5. A ceramic capacitor as recited in claim 2, wherein said first layer is Zn.

6. A ceramic capacitor as recited in claim 1, wherein said first layer is Cu.

7. A ceramic capacitor as recited in claim 1, wherein said first layer is Ni—Cu alloy.

8. A ceramic capacitor as recited in claim 1, wherein said first layer is Zn.

* * * * *